Figure 1:
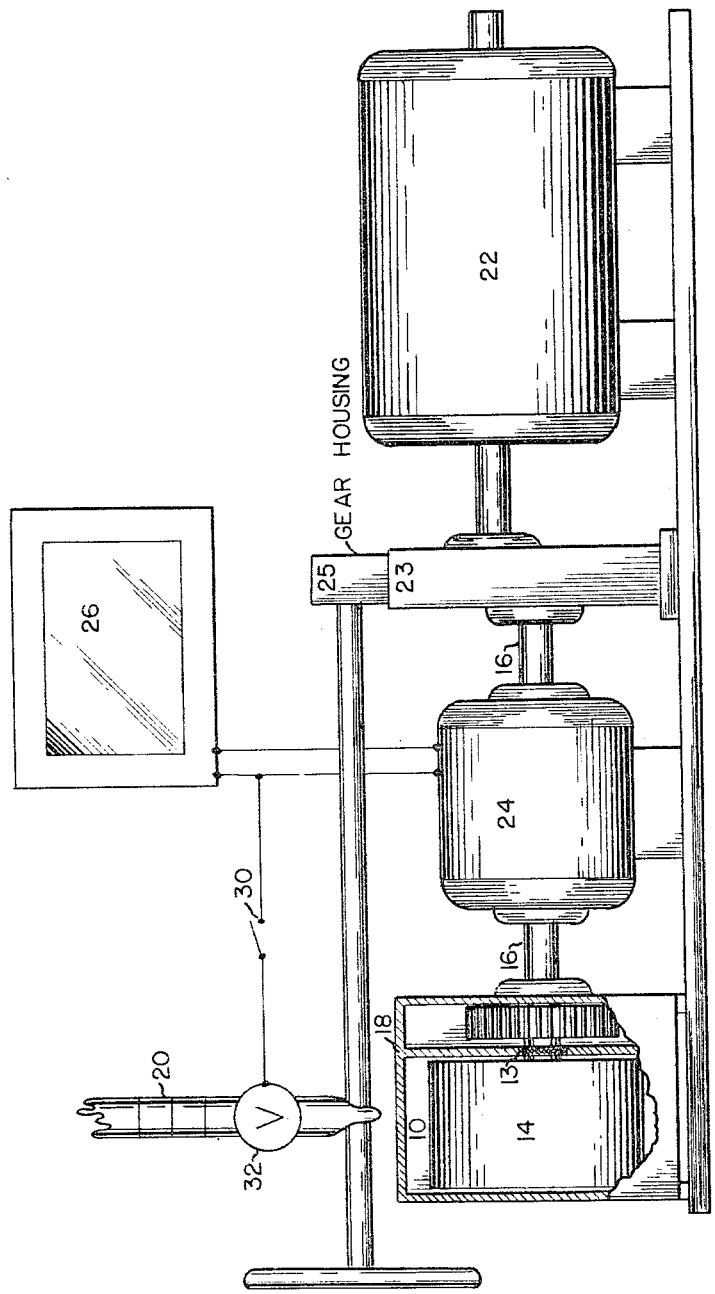

Jan. 18, 1966 V. A. SLJAKA ETAL 3,229,507
METHOD FOR DETERMINING PROPERTIES OF CARBON BLACKS
Filed Aug. 30, 1963 2 Sheets-Sheet 1

INVENTOR.
V. A. SLJAKA, W. H. OPIE JR.

United States Patent Office 3,229,507
Patented Jan. 18, 1966

3,229,507
METHOD FOR DETERMINING PROPERTIES OF CARBON BLACKS
Vincent A. Sljaka, Dorchester, and Webster H. Opie, Jr., Lynn, Mass., assignors to Cabot Corporation, Boston, Mass., a corporation of Delaware
Filed Aug. 30, 1963, Ser. No. 305,769
4 Claims. (Cl. 73—59)

This invention relates to carbon black. More precisely, the invention disclosed herein relates to a novel method for accurately determining the oil absorption capacity for any of the diverse carbon blacks in a consistent, reproducible fashion. Included within the scope of the invention disclosed herein is apparatus which is especially adapted for use in making such determinations according to the method of our invention.

The oil absorption capacity of a carbon black, which essentially is a measure of the oil demand of the black, is an extremely important property thereof, being especially valuable in predicting the performance of a particular black as a pigment in printing inks, paint systems, etc., or as a filler in various rubbers. For example, in printing inks and paint systems a carbon black having low oil absorption is usually desirable since lower oil absorption generally implies that a system containing a given concentration of black will have a lower relative viscosity. Also, at least when blacks having the same origin are involved, the oil absorption is usually considered a fair index of the "structure" of a black; thus, oil absorption is considered by many as a relative indication of the modulus of an elastomeric or plastomeric composition filled with a certain loading of the black.

Essentially the Gardner Oil Absorption method (or slight variations thereof) is most commonly used in the carbon black industry to determine oil absorption values. Usually, in the method's most popular form, a small sample (i.e. usually less than 1 gram) of black is transferred to a glass plate and a standard linseed oil is added dropwise thereto with the oil being thoroughly worked into the black, e.g. "mulled" with a steel spatula after each measured addition. The end point is taken as the point at which the black just coheres and forms a stiff putty like paste. The results are reported in various units; for example, lbs. of oil taken up by 100 lbs. of the carbon black or cc. of oil taken up by 1 gram of black.

A modification of the above-mentioned test is sometimes employed to estimate the extent of structure or particle association present in carbon blacks of the same origin. In this procedure, a somewhat less vigorous technique is employed in incorporating the oil into a somewhat larger black sample to avoid breakdown of the black structure. This modification is sometimes termed the "soft ball" oil absorption in reference to the end point, which is taken as the point where the oil and black may be first rolled under the spatula in a soft ball. This latter technique is believed to provide a good indication of the relative "structure" of blacks produced by the same type of process.

It will be obvious from the above discussion, and it is conceded by those well skilled in the art, that there are many inherent sources of error in present oil absorption measurement methods. For example, a degree of error may arise because of slight variations of pressure on the spatula in mulling the paste when different persons are involved or oftentimes when a single person is involved. Also, the rather small sample of black utilized, e.g. from about 0.25 gram to 1 gram, means that significant deviations in results will be caused by even small errors in weighing. Further, the end point itself gives rise to a rather serious margin of error since it is subject, in each case, to the interpretation of the individual performing the determination. Accordingly, many laboratories generally assign oil absorption determinations to only one highly experienced person in order to increase the reliability of such determinations by at least minimizing the effects of variations which arise because of the human factors involved. In view of the above, any process or method whereby oil absorption determinations can be conducted quickly and precisely in a reproducible fashion by relatively unskilled personnal would be, indeed, a notable contribution to the art. Indeed the need for a reliable or standard method of determining oil absorption values has become recently apparent when the ASTM Committee D-24 dropped attempts to adopt a standard manual test on oil absorption since too much variation in results from laboratory to laboratory have been reported (see page 12 of Rubber World, July 1963, edition).

The principal object of the present invention is to provide a novel method for accurately and quickly determining the oil absorption capacities of carbon blacks.

Another object of the present invention is to provide a method for accurately measuring the oil absorption of carbon blacks in a manner that is both rapid and precise and also essentially independent of the skill and interpretation of the operator performing same.

Other objects and advantages of the present invention will in part appear hereinafter or will in part be obvious to those well skilled in the art.

The above objects and advantages are realized in accordance with the practice of the present invention by continually mixing with a constant intensity, a known amount of carbon black with a standard liquid vehicle, e.g. linseed oil, which is gradually and preferably substantially continuously added in measured amounts to the black, while simultaneously and continually measuring the resistive force of the mixture to the constant speed mechanical device applied to achieve said mixing. We have found that until a particular black has absorbed sufficient oil to satisfy its oil demand, corresponding to its oil absorption capacity, no appreciable change in resistance to the mixing force constantly applied is detected. However, upon satisfying the oil demand, a sharp, readily detectable, increase in torque is developed almost instantaneously thus providing a significant end point for oil absorption determinations. Thus, in accordance with our invention we are able to obtain precise oil absorption measurements for any of the various carbon blacks in a consistently reproducible fashion. Moreover, since the increase in torque may be detected by mechanical means, our measurements are unaffected by the errors and deviations caused by the human factor inherent in the present oil absorption methods. Further, the measurements obtained in accordance with our method correlate remarkably well with those measurements more laboriously obtained by the conventional, manually performed, oil absorption method and slight modifications thereof presently utilized in the art.

Figure 2:
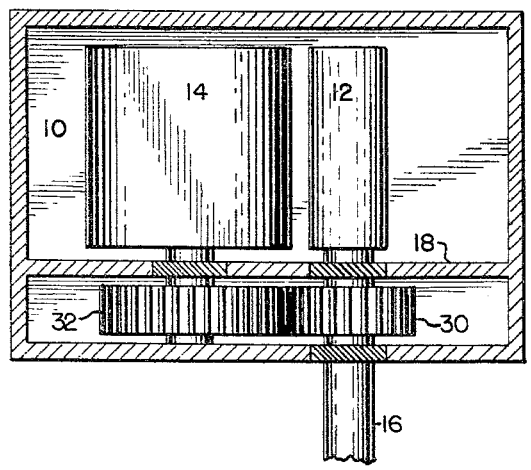
Figure 3:
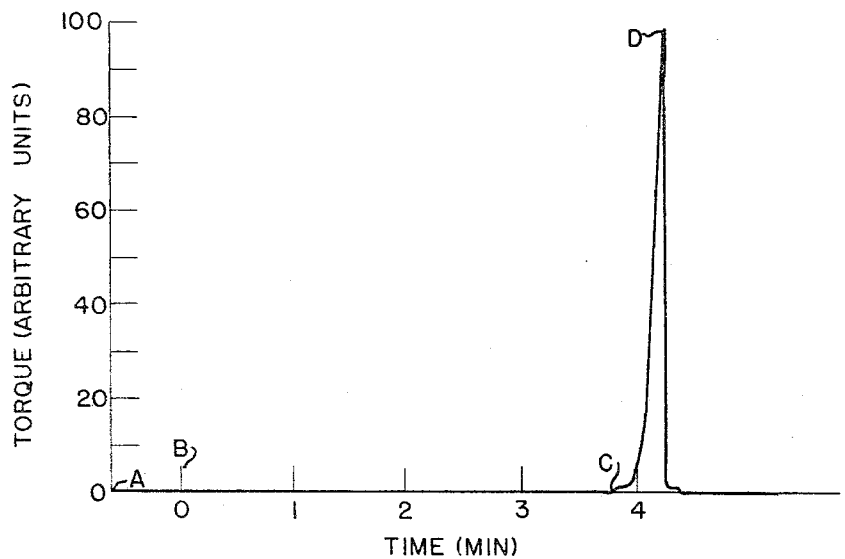

Our invention will be better understood with reference to the attached drawings in which FIGURE 1 is a view in elevation of an arrangement of apparatus especially suitable for practicing the process of the present invention. FIGURE 2 is a top view of the mixing device from FIGURE 1 and illustrates one suitable arrangement of the mixing blades therein. FIGURE 3 shows the tracing made by the torque recorder scribe during a typical determination.

Referring now to FIGURES 1 and 2, a weighed amount of carbon black is placed in chamber 10 which is occupied in part by preferably two mixing blades 12 and 14. Blades 12 and 14 may communicate directly with a common rotatable shaft 16 or if desired may communicate with shaft 16 by way of gears such as 30 and 32 of FIGURE 2. In the apparatus illustrated in FIGURE 1 rotatable shaft 16 passes through the rear wall 18 of chamber 10 with bushing 13 designed to act in part as a sealing means to prevent any leakage of the ingredients from the chamber. The design of the blades 12 and 14 and the design of the chamber 10, e.g. contours, etc., are somewhat critical in that the design of each must cooperate closely to achieve an efficient mixing of the black and oil in chamber 10; the oil is preferably added from a constant rate burette 20 which is positioned above chamber 10. By an efficient mixing we mean a gentle mixing action whereby all the black and added oil are homogeneously mixed preferably with a gentle tumbling action but without excessively violent agitation so as to avoid loss of any of the finely divided black or oil from the mixing region of chamber 10.

Rotatable shaft 16 is operationally connected with a constant speed motor 22. We have found that the practice of the present invention is best obtained when shaft 16 rotates at a constant speed in the range from about 90 to about 130 r.p.m. We have found that there is little breakdown of the "structure" of a black even after long mixing times at the above-mentioned speeds. Any excessive breakdown in "structure" of a black, e.g. the chainlike arrangement of the primary particles of the black, should be avoided in order to obtain accurate oil absorption values for the blacks in their usual form.

As shown, drive motor 22 communicates with shaft 16 generally by way of gears 23 and 25. The exact speed of rotation generally will be determined largely by the design of the mixing blades and chamber utilized and by other factors obvious to those skilled in the art. Accordingly, the range of speeds described above is not to be construed as a strict limitation on our invention but one which is especially preferred in the practice thereof in the type of equipment presently described.

Interposed between chamber 10 and motor 22 and in communication with shaft 16 is torque metering device 24. Obviously, many types of sensitive torque metering devices may be utilized and these may be positioned in any desired effective relationship with either motor 22 or shaft 16. Torque metering device 24 continually measures the torque exerted on shaft 16 by the resistance of the mixture in chamber 10 to mixing blades 12 and 14. In turn, the measurement of torque is continually measured and preferably is graphically recorded for example by strip recorder 26. In order to achieve completely automatic operation of the entire procedure, we provide an adjustable limit switch 30 which can be set to respond to a predetermined degree of increase in torque. When so actuated, the switch 30 deenergizes the solenoid valve 32, thus terminating the flow of oil from burette 20 to chamber 10.

In the practice of our invention in apparatus similar to that set forth above, a weighed amount of black is introduced to chamber 10. The amount of black which we prefer to use varies from about 10.0 to about 25.0 grams, i.e. amounts well in excess of those normally used in the present oil absorption measurement procedures. After introducing the black to the chamber 10, drive motor 22 is started causing shaft 16 to rotate at a constant speed and agitate the weighed sample by means of blades 12 and 14. With the commencement of mixing, the torque metering device 24 continually measures the torque being generated on shaft 16 and, preferably, the measurement obtained is transmitted to a conventional strip chart recorder 26 where the same is recorded in graphical fashion, e.g. starting at point A of FIGURE 3. After the operator is satisfied that equilibrium conditions are present and a constant torque is being exerted (e.g. by referring to the trace of the recorder such as between points A and B of FIGURE 3) valve 32 of burette 20 is energized by any convenient means. Obviously, in accordance with the start up procedure described above, the initial volume of oil in the burette will first be read. However, it is to be understood that a constant rate burette or metering pump, etc. could be utilized instead and the amount delivered to the chamber both determined and controlled automatically.

The rate at which the absorptive liquid is added to the black is somewhat critical in that the rate must not be excessively fast or else the oil will not be uniformly assimilated by the black. On the other hand, the rate utilized need not be so slow so as to needlessly prolong the procedure. In our apparatus we have found that a rate of about 4 cc. of oil/minute is suitable for most blacks. Since the amount of oil added to the sample weights utilized in our procedure generally represents the amounts from about 10 cc. to about 30 cc., this rate corresponds to a rate of addition of from about 13% of the total oil/minute to about 40%. In other words the oil should be added gradually or incrementally over period of time amounting to not less than about 2 minutes and preferably between about 4 to about 8 minutes. Also, the oil need not necessarily be added in equivalent increments but this manner is generally preferred. For example, 75% of the total oil required may be added to the black initially and thereafter the endpoint may be determined by adding equivalent amounts of the oil at a rate similar to above. Further, the type of absorptive liquid is not especially critical so long as the liquid is one which is readily absorbed by the black. We have used linseed oil, mineral oil and rubber processing oils all with equal success.

It will be noted from FIGURE 3 that as the oil from burette 20 is continually added to the constantly agitated black beginning at point B on the trace for example, no significant change in torque is detected as the pen of recorder 26 continues to scribe an essentially straight "base" line. In FIGURE 3 for example, the measured torque along the base line represents about 1 meter gram. During the addition of oil, the mixture of black and oil is maintained in a state of agitation and the mixture passes through first a free-flowing state and then a plastic like state as the end point is approached. As the amount of oil added approaches that required to satisfy the oil demand of the black, a slight displacement of the base line in an upward direction—beginning at about point C of FIGURE 3—is noted due to a slight thickening of the mixture in chamber 10. This slight displacement is soon followed by an extremely sharp displacement of the base line in an upward direction as at point D indicating that a sharp increase in torque has been obtained which in turn signifies that the oil demand of the particular black involved has been satisfied. For example, the measured torque at point D of FIGURE 3 is about 500 meter grams. The sharp increase in torque is caused by the fact that when the oil demand of the black is satisfied, the black-oil mixture in effect tends to set up or solidifies and/or become relatively stiff and rigid. This sudden stiffening of the mixture is observed regardless of the type of black involved and although not quite so extreme or dramatic in all cases, is always sufficient to cause a significant, readily detectable increase in torque over that measured during the earlier stages of the procedure. Accordingly, the sharp increase in torque which occurs at the end point is applicable to all blacks and may be readily detected on a torque indicator dial or recorder by even an unskilled operator, or if desired, by suitable automatic means. In the apparatus which we utilized, we have measured this increase in torque at the end point and have found that the torque generated at the end point in many cases represents an increase in torque of about 100 fold over that originally measured as the oil is first added to the mixture. For example, in many of our determinations the initial torque was found to be about 5 meter grams whereas a torque of about 500 meter grams was measured at the end point.

Since we prefer to use automatic means to control the flow of the oil to the chamber 10, the oil flow control means in our apparatus is normally set to respond to a sudden increase in torque of about 100 meter grams or more representing in most cases, an increase of at least about 10 fold in the running torque. When such an increase in torque occurs, adjustable limit switch 30 is then actuated automatically which deenergizes the solenoid valve 32 thereby terminating the flow of oil to the chamber.

The oil absorption value may be then directly obtained by inserting the observed volume of oil utilized in the following equation:

$$\frac{\text{Total volume of oil used (cc.)}}{\text{Weight of sample (grams)}} = \text{oil absorption cc./g.}$$

The following specific example is offered so that those well skilled in the art will better understand and better appreciate the advantages to be obtained from the practice of our invention.

EXAMPLE 1

All of the following instrumental determinations were obtained by using apparatus arranged in a substantially similar fashion to that set forth in FIGURE 1. Manual values were obtained by practiced experts by use of the soft ball method in which 0.25 to 1.00 grams of black is weighed and transferred to a ground glass mulling plate. Raw linseed oil is then added to the black in dropwise fashion generally from a dropping bottle of known weight and containing a known amount of oil. After each incremental addition of oil, the oil and black are mulled lightly by means of a pallate knife. Minimum pressure is applied during the mulling in order to assimilate the oil and black. The procedure is repeated until sufficient oil is added to cause the black to agglomerate in a unit mass. At this point the mass is rolled into a ball and a slight pressure applied thereto. If the ball cracks open, the end point has not been reached and a fraction of a drop of additional oil is necessary. When the operator performing the determination is satisfied that the end point has been reached, the dropping bottle is weighed and the oil absorption value calculated.

Table I.—Instrumental and manual oil absorption data

Oil Absorption Determinations (cc./gm.)

| Special Blacks | Average Instrumental Determination | Average Deviation | Manual Determinations |
|---|---|---|---|
| Sterling MT—I | 0.33 | 0.023 | 0.33 |
| Sterling MT—II | 0.41 | 0.005 | 0.38 |
| Regal SRF | 0.72 | 0.025 | 0.63 |
| Sterling S—I | 0.73 | | 0.75 |
| Sterling S—II | 0.81 | | 0.82 |
| Sterling L | 0.86 | 0.027 | 0.81 |
| Regal 300 | 0.83 | | 0.88 |
| Regal 600 | 0.90 | | 0.94 |
| Sterling V—I | 1.02 | 0.038 | 0.96 |
| Sterling V—II | 1.04 | 0.030 | 0.93 |
| Vulcan 3—I | 1.09 | 0.005 | 1.14 |
| Vulcan 3—II | 1.11 | 0.010 | 1.17 |
| Sterling SO—I | 1.25 | | 1.25 |
| Sterling SO—II | 1.32 | 0.007 | 1.23 |
| Vulcan 6 | 1.30 | 0.028 | 1.34 |
| Vulcan 9 | 1.27 | 0.007 | 1.31 |
| Vulcan C | 1.47 | 0.014 | 1.31 |
| Vulcan SC | 1.54 | 0.022 | 1.40 |
| XC-72—I | 2.33 | 0.054 | 2.28 |
| XC-72—II | 2.26 | 0.037 | 2.43 |

Table I.—Instrumental and manual oil absorption data.—Continued

Oil Absorption Determinations (cc./gm.)

| Special Blacks | Average Instrumental Determination | Average Deviation | Manual Determinations |
|---|---|---|---|
| Shawinigan Acetylene Black | 2.22 | 0.050 | |
| Vulcan 3—HS | 1.52 | 0.005 | 1.52 |
| Vulcan 6—HS | 1.64 | 0.033 | 1.73 |
| Vulcan 6—LS | 1.06 | 0.007 | 1.12 |
| Regal 99 | 0.71 | 0.030 | 0.67 |
| Sterling 1182 | 1.56 | 0.010 | 1.49 |
| Black Pearls 71 | 1.15 | 0.017 | 1.28 |
| Mogul S | 1.23 | 0.020 | 1.17 |
| Elf 8 | 1.30 | 0.01 | 1.30 |
| Monarch 71 | 1.70 | | 1.68 |
| Black Pearls 46 | 1.73 | 0.01 | 1.82 |
| Carbolac 46 | 2.31 | 0.057 | 2.6$_2$ |

It will be obvious from the above table that our method permits relatively unskilled personnel to rapidly obtain oil absorption values for any of the diverse carbon blacks and the values so obtained are surprisingly precise. Also, it will be obvious from the above table that the oil absorption values obtained in accordance with our method correlate remarkably well with those obtained in the conventional manner.

Many variations in the devices and procedures utilized to illustrate our invention may be introduced thereto without departing from the spirit and scope thereof.

Having described our invention, what we declare to be new and desire to secure by U.S. Letters Patent is as follows:

1. A process for determining the oil absorption characteristics of carbon black comprising mixing a known amount of carbon black in a finite zone by means of a constant speed mechanical action, adding to said black in said zone in measured amounts a standard compatible or readily absorbable liquid at a rate requiring several minutes for completion, measuring the resistive force of the mixture to the mechanical action applied to achieve said mixing at least until a substantial increase in said resistive force is detected and totalling the amount of said liquid added to said black up to the point that the said increase in the said resistive force is detected.

2. The process of claim 1 wherein the said rate requires at least about 2 minutes.

3. The process of claim 1 wherein the said measured amounts of absorptive liquid represents approximately equivalent small increments added at regular intervals.

4. The process of claim 1 wherein the said increase in resistive force detected is an increase of at least about 10 times the resistive force originally measured.

References Cited by the Examiner
UNITED STATES PATENTS

| | | | |
|---|---|---|---|
| 1,334,395 | 3/1920 | Patterson | 73—59 X |
| 2,773,507 | 12/1956 | Norris | 73—59 X |
| 2,917,065 | 12/1959 | Monk | 73—59 X |
| 2,974,524 | 3/1961 | Loska | 73—169 |
| 3,169,395 | 2/1965 | Enoch et al. | 73—59 X |

LOUIS R. PRINCE, Primary Examiner.

DAVID SCHONBERG, Examiner.